United States Patent
Lampin et al.

(10) Patent No.: US 11,540,336 B2
(45) Date of Patent: Dec. 27, 2022

(54) MANAGEMENT OF COMMUNICATION BETWEEN A TERMINAL AND A SERVER OF A NETWORK

(71) Applicant: Orange, Paris (FR)

(72) Inventors: Quentin Lampin, Châtillon (FR); Dominique Barthel, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/767,554

(22) PCT Filed: Nov. 29, 2018

(86) PCT No.: PCT/FR2018/053039
§ 371 (c)(1),
(2) Date: May 27, 2020

(87) PCT Pub. No.: WO2019/106302
PCT Pub. Date: Jun. 6, 2019

(65) Prior Publication Data
US 2020/0374944 A1    Nov. 26, 2020

(30) Foreign Application Priority Data
Dec. 1, 2017 (FR) ...................................... 1761508

(51) Int. Cl.
*H04W 76/10* (2018.01)
*H04W 4/38* (2018.01)
(Continued)

(52) U.S. Cl.
CPC ............. *H04W 76/10* (2018.02); *H04L 67/12* (2013.01); *H04W 4/38* (2018.02); *H04W 12/033* (2021.01); *H04W 88/16* (2013.01)

(58) Field of Classification Search
CPC ....... H04W 12/06; H04W 12/04; H04W 4/70; H04W 12/37; H04W 12/08;
(Continued)

(56) References Cited

U.S. PATENT DOCUMENTS

2004/0221154 A1* 11/2004 Aggarwal ............. H04L 9/0844
713/151
2015/0244720 A1*  8/2015 Suh ..................... H04L 63/0876
726/4
(Continued)

FOREIGN PATENT DOCUMENTS

EP        1 879 332 A1    1/2008

OTHER PUBLICATIONS

International Search Report and Written Opinion dated Feb. 4, 2019 for Application No. PCT/FR2018/053039.
(Continued)

*Primary Examiner* — Kwasi Karikari
(74) *Attorney, Agent, or Firm* — Knobbe, Martens, Olson & Bear, LLP

(57) ABSTRACT

A management method is described, the method implemented by a transmission device capable of communicating via a first wireless with a gateway device forming a node of a telecommunication network and configured to communicate with at least one server of the network via the gateway device. The method can include establishing a secure communication session with a terminal included in a list of terminals for which the transmission device has obtained management data. The method can also include receiving via the first communication link a request to end the management of the terminal, and removing the terminal from the list following the receipt of the request. A transmission device which can be used to implement the management method is also described.

11 Claims, 3 Drawing Sheets

(51) Int. Cl.
*H04L 67/12* (2022.01)
*H04W 88/16* (2009.01)
*H04W 12/033* (2021.01)

(58) Field of Classification Search
CPC ..... H04W 12/069; H04W 4/80; H04W 84/12; H04W 12/062; H04W 12/50; H04W 36/0038; H04W 12/0471; H04W 12/068; H04W 12/0433; H04W 76/00; H04W 84/20; H04W 88/04; H04W 88/08; H04W 8/24
See application file for complete search history.

(56) References Cited

U.S. PATENT DOCUMENTS

| | | | |
|---|---|---|---|
| 2016/0212190 A1* | 7/2016 | Kim | H04L 65/602 |
| 2017/0099361 A1* | 4/2017 | Digilov | H04W 4/023 |
| 2017/0163329 A1* | 6/2017 | Dangy-Caye | H04L 43/12 |
| 2017/0171752 A1* | 6/2017 | Lee | H04W 76/10 |
| 2017/0220810 A1* | 8/2017 | Patel | G06F 21/10 |

OTHER PUBLICATIONS

Hersent et al., "LoRa Device Developer Guide", Orange Connected Objects & Partnerships, Apr. 30, 2016, XP055286484, Retrieved from the Internet: URL:https://partner.orange.com/wp-content/uploads/2016/04/LoRa-Device-Developer-Guide-Orange.pdf.

* cited by examiner

MANAGEMENT OF COMMUNICATION BETWEEN A TERMINAL AND A SERVER OF A NETWORK

RELATED APPLICATIONS

This application is the U.S. National Phase of Application No. PCT/FR2018/053039 entitled "MANAGEMENT OF COMMUNICATION BETWEEN A TERMINAL AND A SERVER OF A NETWORK" and filed Nov. 29, 2018, which claims the benefit of French Patent Application No. 1761508, filed Dec. 1, 2017, each of which is incorporated by reference in its entirety.

The invention lies in the field of telecommunications.

The invention relates more particularly to a communication system in which a terminal communicates with an application server able to provide application services to this terminal via a telecommunications network, and more particularly a server of this network. There is no limit attached to the nature of the terminal or to the nature of the application services that are provided. The terminal may be a fixed or mobile terminal, such as an electricity meter, a sensor, etc. The application server may be operated by any service provider, such as for example an electricity supplier, water supplier, etc.

The invention is also applied preferably, but without limitation, in the context of the Internet of Things, and in particular LoRaWAN™ (for "Long Range Wide Area Network") architectures or wide-area networks. As is known, the LoRaWAN™ protocol being standardized allows low-bitrate radio communication (less than 50 kbit/s) with low power consumption for objects communicating using LoRa™ (for "long range") technology that are connected to the Internet via a communication network.

In a LoRaWAN™ architecture, each terminal is required to communicate with an application server via a telecommunications network. More particularly, the data sent by each terminal, via a radio link, are received by a plurality of gateways or base stations which relay said data to a server of the network, via a wired or cellular connection. This server of the network filters the messages received from the terminals (and in particular checks their origin and their integrity), and relays them to the application servers in question.

Despite radio technology optimized for long range, many terminals designed to operate using LoRa™ technology fail to communicate with the gateways of the desired LoRa™ network because the signals sent by these terminals do not reach the gateways. This is in particular the case when these terminals are for example positioned in areas such as basements, cellars, sheet metal buildings, etc.

As is known, additional gateways may be added to the LoRa™ network in order to allow these terminals to communicate with this network.

However, these gateways are expensive. In addition, they require a mains connection and a cellular or wired connection.

They are therefore not always installed, or are installed later on.

In this situation, which may be temporary or permanent, the terminals are not able to communicate with the servers of the LoRa™ network.

One of the aims of the invention is to remedy inadequacies/drawbacks of the prior art and/or to make improvements thereto.

To this end, the invention relates to a management method.

According to the invention, the management method comprises the following steps implemented by a transmission device able to communicate via a first radio link with a gateway equipment forming a node of a telecommunications network, said transmission device being configured so as to communicate with at least one server of said network via said gateway equipment:

following the reception of a first connection request sent via a second radio link, by a terminal contained in a list of at least one terminal for which said transmission device has obtained management data, establishment of a secure communication session between the transmission device and said terminal, using at least some of the management data;

upon reception of a data message sent by said terminal via the secure session, transferal of said message via the first communication link, if said terminal is contained in said list;

upon reception, via the first radio link, of a data message intended for said terminal, transferal of said message to said terminal via the secure session, if said terminal is contained in said list;

reception, via the first radio link, of a request to end management of said terminal;

following the reception of said request, removal of said terminal from said list.

In a first phase, a terminal is situated outside the coverage area of any gateway equipment.

Therefore, although it is configured so as to communicate, via a gateway equipment of the network, with an application server of this network, it is not able to communicate with any gateway equipment.

The transmission device, also called a repeater device, is positioned within the radio coverage area of the terminal so as to allow this terminal to access the network and to communicate with an application server associated with the terminal, via the network server. By virtue of this transmission device, a terminal configured so as to connect to an application server of the network but that is not able to directly access a gateway equipment of the network via a radio link is able to communicate with the network server and therefore with an application server via the network server.

The network is for example a LoRa™ network.

The transmission device behaves like a terminal with respect to the network. It thus communicates with a gateway equipment via radio signals, for example long-range radio signals. The gateway equipment relays the information coming from the transmission device to a server of the network. This server is typically a server, generally called a "network server" capable of relaying this information to a management server associated with the transmission device. In turn, the information coming from the management server and intended for the transmission device is transmitted to this device via the network server or servers and via the gateway equipment.

The management server is an application server associated with the transmission device.

More particularly, the terminal sends a connection request to an application server of the network. The connection request is intercepted by the transmission device, which holds management data representative of a right to manage the terminal. The transmission device and the terminal then mutually establish a secure communication session. The transmission device uses at least some of the management data in order to establish this secure communication session between the transmission device and the terminal. Establishing the secure session makes it possible firstly to send messages using the terminal and to receive these messages using the transmission device and secondly to send messages using the transmission device and to receive these messages using the terminal.

Following the establishment of the secure session, the messages sent by the terminal via the second communication link and received by the transmission device are relayed by the transmission device to a server of the network via the first communication link. In turn, the messages sent via the first communication link by a server of the network to the terminal are received by the transmission device and relayed thereby to the terminal via the second communication link and more particularly via the secure communication session.

In this first phase in which the terminal is outside the radio coverage of any gateway equipment of the network, the transmission device, by virtue of the management data, establishes the communication session in the same way as a server of the network would have done if the connection request had reached it. The transmission device therefore acts as a server of the network in order to establish the communication session.

In one particular embodiment in which the network is a LoRa™ network, establishing the session using the transmission device allows the latter to respond to the terminal within a period corresponding to the expectations of the terminal. Specifically, according to the LoRaWAN™ protocol, the terminal is configured so as to receive a response to a connection request within a predefined period. Beyond this period, it no longer listens for a response.

After establishing the session, the transmission device acts as a relay for this terminal for which it has received management rights.

Thus, by virtue of the transmission device, a terminal situated outside the radio coverage area of any gateway equipment of the network is able to communicate with at least one server of this network.

In a second phase, the terminal is situated within the coverage area of a gateway equipment of the network while at the same time remaining positioned in the coverage area of the transmission device. This change of situation is for example due to the installation of an additional gateway equipment or to the movement of the terminal.

This gateway equipment is able to transmit the signals sent by the terminal to at least one server of the network and to transmit the signals transmitted by a server of the network to the terminal, to the terminal.

In order to avoid the messages exchanged between the terminal and a server of the network transiting via the transmission device, on the one hand, and via the newly accessible gateway equipment, on the other hand, a message requesting to end management of the terminal is sent to the transmission device. This message signals to the transmission device that it should no longer manage this terminal and, consequently, remove this terminal from the list of terminals that it manages.

By virtue of removing the terminal from the list of terminals managed by the transmission device, the messages sent by the terminal are no longer relayed by the transmission device. In turn, messages intended for the terminal and received by the transmission device are no longer transmitted thereby to the terminal.

Thus, only the newly accessible gateway equipment serves as a relay for these messages.

The method thus makes it possible to transition from management by the transmission device to management via the newly accessible gateway equipment, without transiting via the transmission device, without requiring modifications in terms of the terminal. This procedure is transparent for the terminal.

Advantageously, the communication links between the various servers and between a server of the network and a gateway equipment are conventional wired or cellular links.

There is however no limit associated with the type of these links.

Advantageously, the link between the transmission device and the terminal is a long-range radio link using LoRa™ technology. Terminals configured so as to comply with the LoRaWAN™ protocol are thus able to access application servers via a LoRa™ network via the transmission device without it being necessary to adapt them.

However, the link between the transmission device and the terminal may be a radio link having different characteristics, for example a short-range radio link.

According to one particular embodiment of the management method, following the reception of said request, the transmission device sends, to said terminal, a request for said terminal to send a second connection request.

The reception of this end of management request message by the transmission device triggers the sending of a message by this transmission device to the terminal. This message tells the terminal that it should resend a new connection request.

When the new connection request is sent by the terminal, the transmission device does not process this request. The connection request is taken into account only by the gateway equipment newly accessible to the terminal.

Sending a new connection request makes it possible to establish a new communication session between the terminal and a server of the network. This makes it possible to bolster the security of the system.

According to one particular characteristic of the management method, establishing the secure session comprises generating a session key shared between the transmission device and the terminal, said key being generated from at least some of the management data.

By virtue of the management data obtained by the transmission device, the session key is generated by the transmission device as though it had been generated by a server of the network.

In one particular embodiment, the management data comprise a primary key known to the network, and more precisely to at least one server of the network, and transmitted to the transmission device. The session key is generated from the primary key. This session key is also generated by the terminal, which also possesses the primary key.

Thus, by virtue of obtaining the primary key, the transmission device is able to act as a server of the network in order to generate the session key.

According to one particular embodiment of the management method, said end of management request is received via said gateway equipment and via said network server.

The transmission of the end of management request via said gateway equipment and via said network server is easy to implement.

The transmission device thus receives the management request via a radio link. It is therefore not necessary to provide other communication means, such as for example a wired link, a 4G link, etc. between the transmission device and the management server.

According to one particular embodiment of the management method, the end of management request is transmitted to the transmission device via a secure communication session established between the transmission device and a server of said network.

This allows secure transmission of the end of management request.

According to one particular embodiment of the management method, the send request is sent in response to a message sent by said terminal via the communication session established between the terminal and the transmission device.

In this embodiment, the terminal initiates the exchange of messages, and the servers of the network are able to communicate with the terminal only in response to a message sent thereby. This thus avoids the terminals having to constantly remain listening, which consumes power. The transmission device is seen by the network as a terminal.

According to one particular embodiment of the management method, the terminal is removed from the list after reception of an acknowledgement of receipt sent by the terminal in response to the send request.

The transmission device thus manages this terminal until it has confirmation that its reconnection request has been received by the terminal. This makes it possible to avoid loss of data messages.

According to one particular embodiment of the management method, the reception of the end of management request is followed by sending of a New Channel request defined in the LoRaWAN™ standard.

Sending this message makes it possible to transmit configuration parameters to the terminal. These configuration parameters allow the terminal to adapt the configuration of the radio signals sent or received by the terminal.

Sending this message makes it possible in particular to invalidate frequency channels specific to the transmission device and not used by the gateway equipments of the network.

According to one particular embodiment of the management method, said data messages sent by the terminal comprise data encrypted or signed with the session key shared by the terminal and the transmission device.

According to one particular embodiment of the management method, the method comprises a step of transmitting data relating to the generated session key to a server of the network.

Transmitting these data allows the server of the network to have the session key. This thus allows the server of the network to decrypt and/or verify the signature of messages sent by the terminal and relayed by the transmission device. In turn, this allows the server of the network to encrypt and/or sign messages sent to the terminal.

Thus, by virtue of the transmitted data relating to the session key, the terminal and the server of the network behave as though the transmission device did not relay the messages.

Everything takes place as though the session key had been generated by a server of the network.

The data relating to the session key are the session key.

As an alternative, the data relating to the session key are data used by the transmission device to generate the session key. They allow the server of the network to generate the same session key.

The transmitted data may also comprise data generated by the transmission device when the session is established, for example an address of the terminal.

More generally, the transmitted data are data generated by the transmission device or received from the terminal during the session establishment phase.

The invention also relates to a transmission device.

The transmission device comprises:

a first communication module configured so as to communicate with a gateway equipment forming a node of a telecommunications network via a first radio link and to communicate with at least one server of the network via said gateway equipment;

a second communication module configured so as to communicate with at least one terminal via a second radio link, said second communication module being configured so as to receive, via the second radio link, a first connection request sent by a terminal contained in a list of at least one terminal for which said transmission device has obtained management data;

an authentication module configured so as to establish, following the reception of the first connection request, a secure communication session between the transmission device and said terminal, using at least some of the management data;

a transfer module configured so as to transfer, via the first communication link, at least one data message sent via the secure session, by said terminal, if said terminal is contained in said list, and to transfer, upon reception of a data message intended for said terminal via the first communication link, said message to said terminal via the secure session, if said terminal is contained in said list;

the first communication module being configured so as to receive, via the first communication link, a request to end management of said terminal;

a management module configured so as to remove said terminal from said list following the reception of said request. According to one particular embodiment, the management module is also configured so as to control the sending, to said terminal, of a request for said terminal to send a second connection request.

The invention also relates to a computer program product comprising instructions for implementing a management method such as described above when this program is executed by a processor.

The invention thus relates to software or a program, able to be executed by a computer or by a data processor, this software/program including instructions for commanding the execution of the steps of a management method. These instructions are intended to be stored in a memory of a computer device, loaded and then executed by a processor of this computer device.

This software/program may use any programming language, and be in the form of source code, object code, or of intermediate code between source code and object code, such as in a partially compiled form, or in any other desirable form.

The computer device may be implemented by one or more physically separate machines and has the overall architecture of a computer, including components of such an architecture: data memory(ies), processor(s), communication bus (es), hardware interface(s) for connecting this computer device to a network or another equipment, user interface(s), etc.

The invention also relates to an information medium able to be read by a data processor and containing program instructions, such as mentioned above. The information medium may be any entity or device capable of storing the program.

Other particular features and advantages of the present invention will become apparent in the following description of embodiments, given by way of non-limiting example, with reference to the appended drawings, in which.

The invention is implemented by way of software and/or hardware components. In this regard, the term "module" may correspond in this document equally to a software component, to a hardware component or to a set of hardware and/or software components, able to implement a function or a set of functions, according to what is described below in respect of the module in question.

A software component corresponds to one or more computer programs, one or more subroutines of a program, or more generally to any element of a program or of software. Such a software component is stored in memory and then loaded and executed by a data processor of a physical entity (terminal, server, gateway, set-top box, router, etc.), and is able to access the hardware resources of this physical entity (memories, recording media, communication buses, electronic input/output cards, user interfaces, etc.).

In the same way, a hardware component corresponds to any element of a hardware assembly. This may be a programmable hardware component or one with an integrated processor for executing software, for example an integrated circuit, a chip card, an electronic card for executing firmware, etc.

Figure 1:
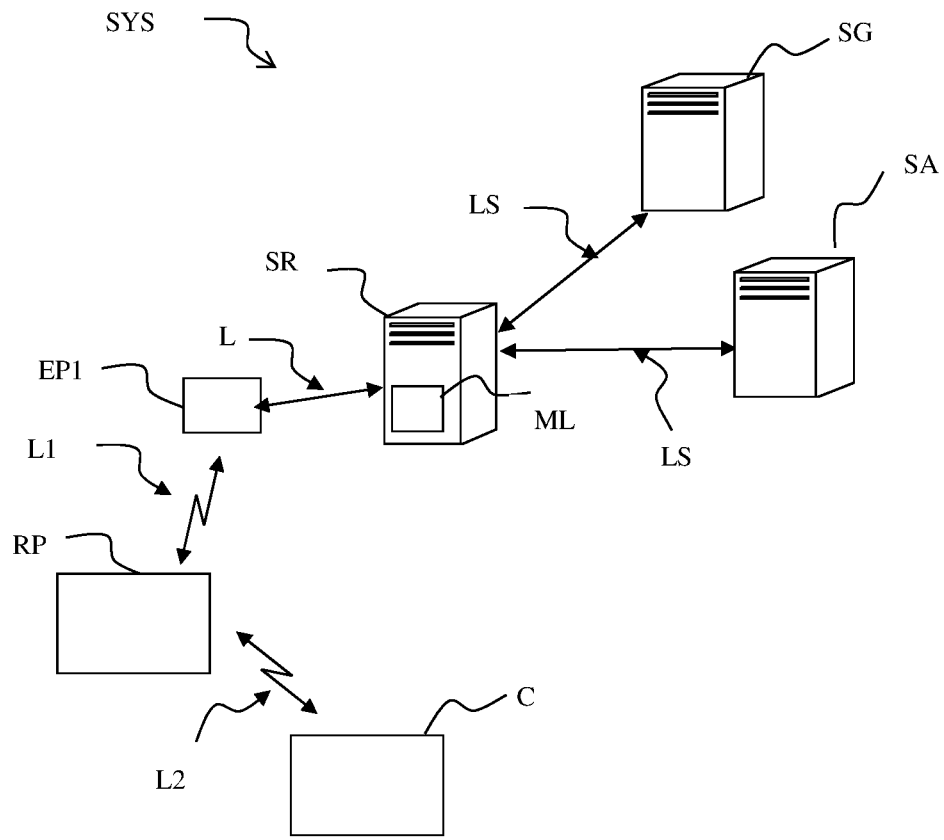
FIG. 1 is a diagram illustrating a system in a first configuration state and according to one particular embodiment of the invention.
Figure 2:
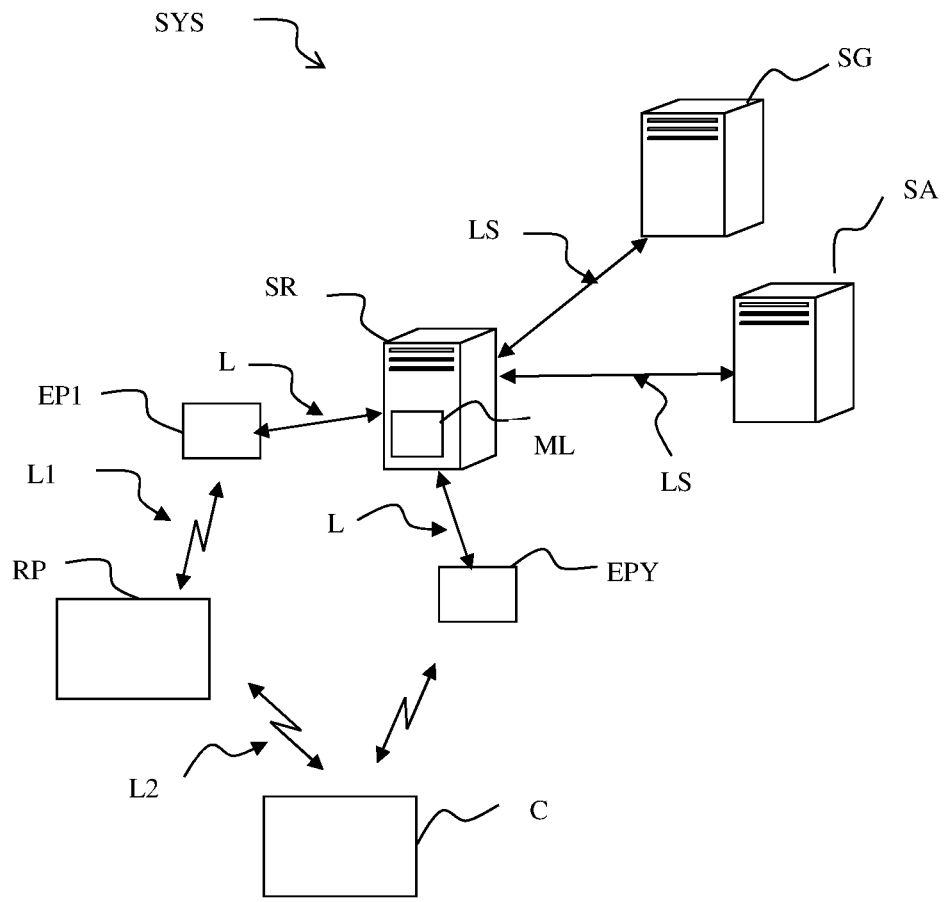
FIG. 2 is a diagram illustrating the system of FIG. 1 in a second configuration state.

FIG. 1 and FIG. 2 show a communication system SYS according to the invention, in one particular embodiment.

In the example under consideration, the communication system SYS is based on a wide-area telecommunications network implementing the LoRaWAN™ protocol. As is known, the LoRaWAN™ protocol is particularly well suited in the context of the Internet of Things to allow various communicating objects to exchange with servers on the Internet.

There is no limit attached to the nature of the communicating objects. These may be various terminals such as sensors, actuators, or any other type of object. As is known, such objects, due to their hardware and/or software constraints, are not able to connect to the Internet via conventional access networks such as WiFi, cellular or wired Internet networks in order to access the application servers to which they are attached: they communicate with these servers via a telecommunications network adapted to their constraints, such as LoRaWAN™, using a star topology.

The communication system SYS comprises at least one transmission device RP, at least one terminal C, at least one gateway equipment, a network server SR, a management server SG and at least one application server SA.

The management server SG is an application server associated with the transmission device RP.

The communication system SYS comprises for example a gateway equipment EP1.

There is no limit attached to the number of application servers, to the number of transmission devices, to the number of gateway equipments or to the number of terminals.

The network server SR is able to communicate with the management server SG, on the one hand, and with the application server SA, on the other hand, via a link LS.

The link LS is for example a wired link.

The link LS is preferably secure.

Each gateway equipment is able to communicate with one or more terminals via a radio link, on the one hand, and to communicate with the network server SR or other equipments of the network via a communication link L, on the other hand.

The communication link L is for example a wired or cellular link.

There is no limit associated either with the type of the link LS or with the type of the link L.

As is known, the network server SR is responsible for filtering and checking the integrity and the authenticity of the messages received via the link L before transmitting them to the application servers in question.

The network server SR also has access to a memory ML containing a list LT of the connected terminals. The list LT comprises in particular, for each connected terminal, an identifier of said terminal in association with information relating to a communication session established for this terminal. This information is for example an identifier of the application server to which it is connected, one or more session keys, an address assigned to the connected terminal, etc. Connected terminal is understood here to mean a terminal for which a communication session has been established and is ongoing.

The information contained in the list LT allows the network server SR to perform integrity checks before transmitting or not transmitting a received message.

The information recorded for a connected terminal is for example removed from the list LT at the end of the communication session.

The data exchanged between the various servers SR, SA and SG of the network are indifferently encrypted with shared keys or private-public key pairs or any other encryption method, or transmitted in open form. There is no limit associated with how these data are exchanged.

The terminal C is a communicating object.

More precisely, the terminal C is configured so as to send and receive data via a radio link.

The terminal C is for example a water meter.

The application server SA is for example a server of a water supplier able to process the data fed back by the water meter C and to provide an application service. This application service is for example the drawing up of a bill from the fed-back data, and the provision of this bill to a user associated with the meter C. The user may moreover be provided with a detailed history of his consumption on a web portal of the water supplier, etc.

The terminal C is configured so as to communicate with the application server SA via the network server SR, and possibly via gateways or base stations.

This means that, when it is installed in a radio coverage area of a gateway equipment, it is able to communicate with the application server SA via a radio link between the terminal and this gateway equipment, via this gateway equipment, the link L, the network server SR and the link LS.

To this end, the terminal C comprises a memory in which an identifier IdC of the terminal C, an identifier IdS of the application server SA associated with the terminal C and a primary (or master) cryptographic key KPC were recorded during a preliminary initialization phase. The primary key KPC is for example stored in a secure memory of the terminal C.

The primary key KPC is also stored in a memory accessible to the network server R, for example a secure memory of the network server SR, for example in association with the identifier IdC of the terminal C and the identifier IdS of the application server SA.

The transmission device RP is configured so as to communicate with the management server SG via the network server SR, and possibly via gateways or base stations.

In the example shown here, the transmission device RP is situated within the radio coverage area of the gateway equipment EP1 and communicates with the gateway equipment EP1 via a radio link L1.

The radio link L1 represents a first communication link within the meaning of the invention.

The transmission device RP communicates with the management server SG via the radio link L1 between the transmission device RP and the gateway equipment EP1, via the gateway equipment EP1, the link L, the network server SR and the link LS.

The transmission device RP is also able to receive the radio signals sent by one or more terminals for which it has obtained management rights, for example in the form of a management request as described below. It is also able to send radio signals intended for this terminal or these terminals.

FIG. 1 shows an example of a first configuration state of the system SYS.

In this figure, the terminal C is situated within radio range of the transmission device RP. It is situated outside the radio range of the gateway equipment EP1 and is not able to communicate directly either with this gateway equipment EP1 or with other gateway equipments of the system SYS.

The radio signals sent by the terminal C do not reach a gateway equipment of the network. They also do not reach the network server SR directly.

The terminal C is for example situated underground, for example in a cellar of a building, in a sheet metal building, etc.

However, since the terminal C is situated within the radio coverage area of the transmission device RP, the terminal C and the transmission device RP communicate via a radio link L2.

In the described embodiment, the radio links L1 and L2 are links using low-bitrate and low-consumption LoRa™ technology. The sent and received radio signals are long-range low-bitrate (less than 50 Kbits/s) signals.

As an alternative, one or more of the links L1 and L2 are radio links of different types.

FIG. 2 shows an example of a second configuration state of the system SYS.

As illustrated in FIG. 2, an additional gateway equipment EPY has been added and the terminal C is now situated within radio range of the gateway equipment EPY while at the same time remaining within range of the transmission device RP.

As an alternative, the gateway equipment EPY was initially installed within the system SYS and the terminal is located within range of this gateway equipment EPY following a movement of the terminal C while at the same time remaining within range of the transmission device RP.

Figure 3:
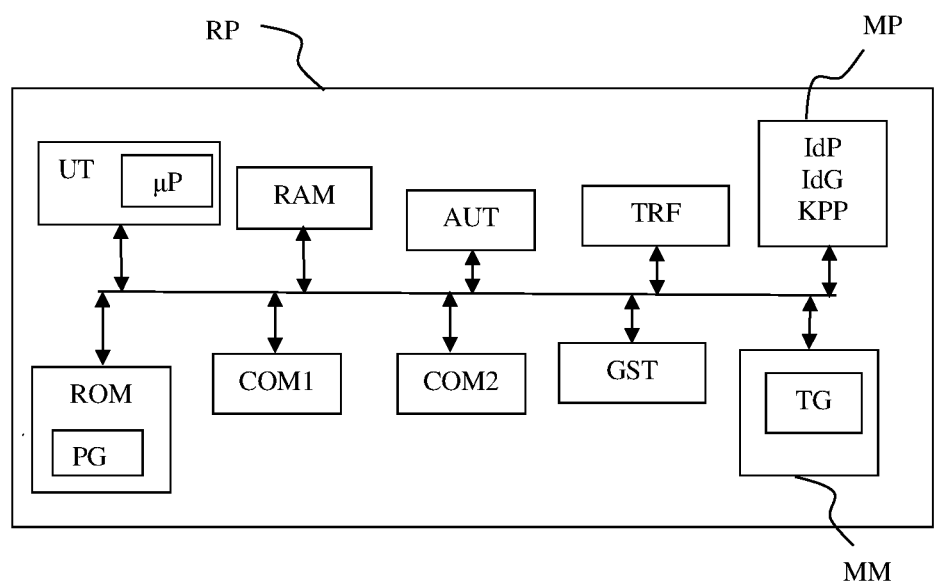
FIG. 3 is a diagram showing a transmission device able to implement a management method according to one embodiment of the invention.

As illustrated in FIG. 3, the transmission device RP comprises, as is known, in particular a processing unit UT equipped with a microprocessor, a ROM read-only memory, and a RAM random access memory.

Figure 4:
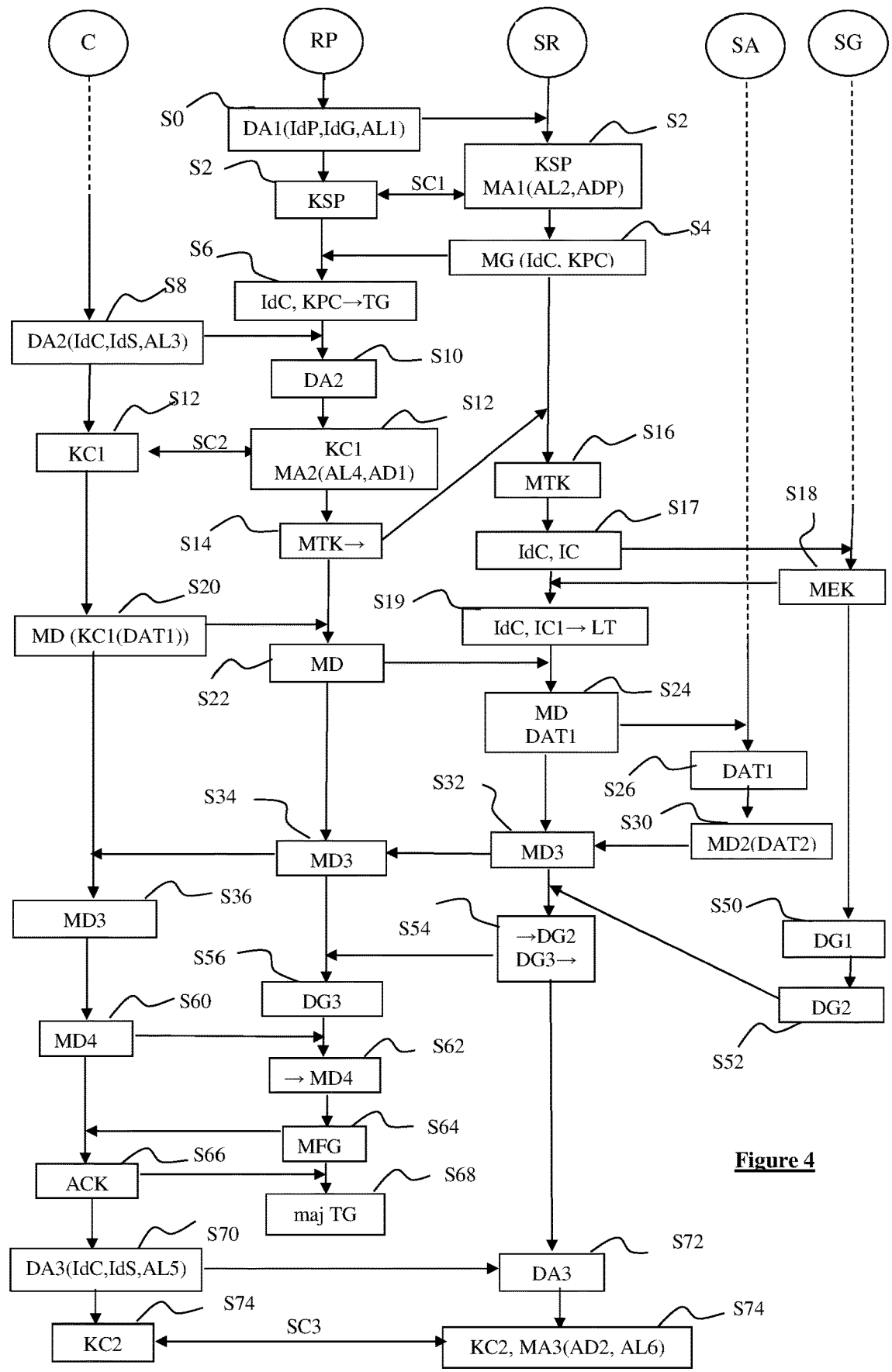
FIG. 4 is a flowchart illustrating the various steps of a management method according to one particular embodiment of the invention.

The ROM read-only memory comprises registers storing a computer program PG containing program instructions designed to implement a management method according to one embodiment of the invention that is described later on with reference to FIG. 4.

The transmission device RP also comprises a memory MP, for example a secure memory, in which an identifier IdP of the transmission device RP, an identifier IdG of the management server SG associated with the transmission device RP and the primary (or master) cryptographic key KPP were recorded during a preliminary initialization phase, for example during installation thereof. The primary key KPP is a key associated with the management server SG. It is shared by the transmission device RP and by the network server SR.

The primary key KPP is also stored in a secure memory of the network server SR, for example in association with the identifier IdP of the transmission device RP and the identifier IdG of the management server SG.

The transmission device RP also comprises a first communication module COM1 and a second communication module COM2.

The first communication module COM1 is configured so as to receive and send radio signals sent via the link L1, typically between the transmission device and the gateway equipment EP1.

The second communication module COM2 is configured so as to receive and send radio signals sent via the link L2, typically between the transmission device RP and the terminal C.

The modules COM1 and COM2 may optionally be one and the same module.

The transmission device RP also comprises an authentication module AUT, a transfer module TRF and a management module GST.

The transmission device RP also contains a memory MM in which a list TG of terminals managed by the transmission device RP has been recorded beforehand. The memory MM contains a terminal identifier and associated management data for each terminal in the list TG. The management data represent management rights within the meaning of the invention.

A first embodiment of a management method, implemented in the system SYS, will now be described with reference to FIG. 4.

In this embodiment, it is assumed that the list TG contains at least one terminal, for example the terminal C. More precisely, the list TG contains the identifier IdC of the terminal C and management data DG.

The management data DG associated with terminal C in particular contain the primary key KPC associated with the terminal C.

The list TG is for example initialized in an installation phase of the transmission device RP. A terminal may be added to the list TG by sending a command sent by the management server SG.

There is no limit associated with the registration of a new terminal in the list. The registration procedure must however be secure in order to avoid attacks targeting the confidentiality of the data exchanged by the terminals, or the authentication of the terminals themselves by the network.

In a step S0, the authentication module AUT of the transmission device RP transmits a connection request DA1 to the network server SR. The connection request DA1 is sent by the transmission device RP via the radio link L1. It is relayed to the network server SR by the gateway equipment EP1 via the link L.

The connection request DA1 contains the identifier IdP of the transmission device RP, the identifier IdG of the management server SG to which the transmission device RP requests to be connected and a random value AL1 generated by the transmission device RP.

The connection request DA1 is for example a JoinRequest message defined in the LoRaWAN™ standard.

In a step S2, following the reception of the request DA1, the transmission device RP and the network server SR establish a communication session SC1.

Establishing the communication link SC1 comprises an authentication step performed firstly by the transmission device RP and secondly by the network server SR.

More specifically, the network server SR generates a random value AL2. It then generates a session key KSP by applying a predefined mathematical function F1 to the following parameters: the primary key KPP, the received random value AL1, the random value AL2.

The generation of a session key, also called a derived key, from a primary (or master) key is a technique known to those skilled in the art and will not be described here.

The function F1 is for example an AES (for "Advanced Encryption Standard") function.

There is no limit associated with the function F1.

The network server SR also generates an address ADP for the transmission device RP.

As an alternative, the ADP address is not generated.

The network server SR then generates and sends a connection acceptance message MA1 in response to the authentication request DA1. The message MA1 contains in particular the random value AL2 and the generated address ADP. It may also contain connection parameters such as for example a list of valid channels for communicating via the link L1 and/or a list of channels to be invalidated and/or a maximum response time within which a response to a message sent by the terminal should be received. This response time is for example 1 second.

The message MA1 is for example a JoinAccept message defined in the LoRaWAN™ standard.

Information relating to the connection, that is to say to the established session SC1, is recorded in association with an identifier of the transmission device RP, for example the identifier IdP, by the network server SR in a memory accessible to the network server SR, for example in the list LT of connected terminals.

This information is for example the identifier IdG of the management server SG and the generated session key KSP.

Following the reception of the message MA1, the authentication module AUT of the transmission device RP in turn generates the session key KSP. The session key KSP is generated by applying the function F1 to the primary key KPP stored in the memory MP of the transmission device RP, the first random value AL1 generated by the transmission device RP and the second random value AL2 received in the message MA1.

In the described embodiment, establishing the session comprises mutual authentication of the transmission device RP and of the network server SR.

As an alternative, the session key KSP is for example generated by a security device (not shown) and recorded beforehand in the transmission device RP, on the one hand, and in the network server SR, on the other hand.

Following step S2, the transmission device RP and the network server SR respectively have the same session key KSP. In other words, the session key KSP is shared by the transmission device RP and the network server SR for the communication session between the transmission device RP and the network server SR.

As is known, establishing the session SC1 allows the transmission device RP to transmit data messages to the management server SG. The data messages contain the identifier IdP of the transmission device RP, the identifier IdG of the management server SG and data encrypted with the session key KSP. The data messages are received by the network server SR, which decrypts the data with its session key KSP. The network server SR then transmits, via the link LS, the decrypted data to the management server SG associated with the transmission device RP.

In turn, the management server SG may transmit a message in response to a message received from the transmission device RP. This message is transmitted by the management server SG to the network server SR, which encrypts its content with the session key KSP before transmitting it to the transmission device RP.

Step S2 is followed by a step S4 in which the network server SR sends a message MG intended for the transmission device RP.

The message MG contains the identifier IdC of the terminal C, the identifier IdS of the application server SA associated with the terminal C and the primary key KPC associated with this terminal.

As an alternative, the message MG does not comprise the identifier IdS.

Also, as an alternative, the message MG comprises other data.

The message MG is transmitted to the transmission device RP via the gateway equipment EP1.

The data in the message MG are encrypted with the session key KSP by the network server SR.

The message MG is for example generated by the network server SR following the reception, by the network server SR, of a request to manage the terminal C using the transmission device RP sent by the management server SG.

The message MG is a request to manage the terminal C. The data contained in the message MG represent management data DG associated with the terminal C.

The message MG is for example transmitted to the transmission device RP in response to an interrogation message sent by the transmission device RP.

Step S4 is followed by a step S6 in which, following the reception of the message MG by the first communication module COM1 of the transmission device RP, the management module GST of the transmission device RP obtains, using the previously calculated session key KSP, the data contained in the message MG, in particular the identifier IdC of the terminal C, the identifier IdS of the server SA and the primary key KPC associated with this terminal. It then records these data in a memory of the transmission device RP.

In the embodiment described, these data are recorded in the list TG of terminals managed by the transmission device RP. The list TG contains, for each terminal managed by the transmission device RP, an identifier of said terminal and associated management data DG. The identifier IdS and the primary key KPC in this case represent management data DG within the meaning of the invention.

As an alternative, the identifier IdC, the identifier IdS and the associated primary key KPC are recorded in the transmission device RP in an initialization phase prior to the establishment of the session SC1. It is then not necessary for the network server SR to transmit these data.

In a step S8, the terminal C sends a connection request DA2 to the application server SA via the second communication link L2.

The connection request DA2 contains the identifier IdC of the terminal C, the identifier IdS of the application server SA to which the terminal C requests to be connected and a random value AL3 generated by the terminal C.

The connection request DA2 is for example a JoinRequest message defined in the LoRaWAN™ standard.

The request DA2 is received by the second communication module COM2 of the transmission device RP in a step S10. Also, in step S10, the transmission device RP, via its management module GST, verifies that the request DA2 is sent by a terminal from the list TG of terminals for which it has received management rights.

If the terminal that sent the request DA2 is not contained in the list TG of terminals managed by the transmission device RP, the transmission device RP does not process the request DA2.

Since the terminal C, and more precisely the identifier IdC of the terminal C, is contained in the list TG, step S10 is followed by a step S12 in which a communication session SC2 is established between the terminal C and the transmission device RP.

More precisely, following the reception of the connection request DA2, the authentication module AUT of the transmission device RP generates a random value AL4, a session key KC1 and an address AD1 for the terminal C. The session key KC1 is generated conventionally using the primary key KPC associated with the terminal C, the received random value AL3 and the random value AL4.

The transmission device RP then generates and transmits a connection acceptance message MA2 via the communication module COM2. The message MA2 contains in particular the random value AL4 and the generated address AD1. It may also contain configuration parameters of the terminal C.

The message MA2 is for example a JoinAccept message defined in the LoRaWAN™ standard.

Following the reception of the message MA2, the terminal C in turn generates the session key KC1.

Thus, following step S12, the terminal C, on the one hand, and the transmission device RP have the same session key KC1. In other words, the session key KC1 is shared by the terminal C and the transmission device RP.

In a step S14, following step S12, the first communication module COM1 of the transmission device RP sends a message MTK, via the link L1.

The message MTK contains the identifier IdC of the terminal C, the session key KC1 generated by the transmission device RP and the generated address AD1. The data contained in the message MTK are encrypted with the session key KSP shared between the transmission device RP and the network server SR.

As a variant, the message MTK does not contain the key KC1 and the message MTK contains data allowing the network server SR to generate this key KC1, that is to say in particular the first random value AL3 and the second random value AL4.

In one particular embodiment, the transmission device RP commands the deletion of the previously generated key KC1 from its memory, for example after sending the message MTK.

As an alternative, the key KC1 remains stored in a memory of the transmission device RP.

The message MTK is received by the network server SR in a step S16.

Step S16 is followed by a step S17 in which the network server SR obtains the session key KC1 and the address AD1 by decrypting the data in the message MTK using the key KSP stored in one of its memories.

The data thus obtained are transmitted to the management server SG, which analyzes them and generates a message MEK requesting recording of the terminal C in the list LT of connected terminals and transmits it to the network server SR (step S18).

More precisely, the message MEK is a request to record the identifier IdC and information IC1 relating to the communication session SC2 in the list TG.

The information IC1 is for example the identifier IdS of the application server SA, the session key KC1 and the address AD1.

In a step S19, the network server SR receives the message MEK and records the terminal C in the list LT of connected terminals. For example, the network server SR records the information IC1 relating to the communication session SC2 in association with the identifier IdC of the terminal C.

As an alternative, the message MTK is transmitted to the management server SG by the network server SR and the data in the message MTK are decrypted by the management server SG.

In a step S20, performed after the steps described above, the terminal C having data DAT1 to be transmitted to the application server SA generates and transmits a message MD, via the communication link L2.

The data DAT1 are for example measured data obtained by the terminal C.

More generally, the data DAT1 are data that the terminal C wishes to transmit to the application server SA.

There is no limit associated with the type of data DAT1 in the data message MD.

The message MD contains the identifier IdS of the application server SA, the address AD1 of the terminal C as well as the data DAT1 encrypted with the generated session key KC1 generated by the terminal C. The message MD may also contain the identifier IdC of the terminal C.

The message MD is received by the second communication module COM2 of the transmission device RP in a step S22.

Also in step S22, the management module GST of the transmission device RP verifies that the message MD comes from the terminal C.

If the verification is positive, the transfer module TRF of the transmission device RP commands sending of the message MD by the first communication module COM1 of the transmission device RP.

The data message MD sent by the terminal C and received by the transmission device RP is thus relayed by the latter.

If the verification is negative, for example if the message MD received by the transmission device RP is a message sent by a terminal for which the transmission device RP has not received rights, for example the terminal identifier and the primary key of the terminal, the message is not relayed by the transmission device RP.

The message MD resent via the link L1 by the first module COM1 of the transmission device RP is received by the network server SR in a step S24.

The network server SR then verifies that the terminal C is registered in the list LT of connected terminals.

If this is the case, using the data IC1 recorded in association with the identifier IdC of the terminal C in the list LT, the network server SR is able to perform integrity checks on the message MD.

If the terminal is not registered in the list LT or if the network server SR considers that the checks are not satisfactory, the message MD is not transmitted to the application server SA.

Otherwise, also in step S24, the data DAT1 are obtained by the network server SR by decrypting the message MD using the session key KC1 recorded in association with the identifier IdC of the terminal C in the list LT.

The network server SR then transmits the data DAT1 to the application server SA (step S24) and the data DAT1 are received by the application server SA in a step S26.

In the described embodiment, in step S22, the message MD is relayed without being processed by the transmission device RP.

As an alternative, the message MD is encrypted with the session key KSP by the transmission device RP before being transmitted. It is then decrypted by the network server SR using the session key KSP.

Steps S20 to S26 may be reiterated one or more times.

One of steps E26 may be followed by a step S30 in which the application server SA having data DAT2 to be transmitted to the terminal C generates and transmits a message MD2 to the terminal C.

The message MD2 is received by the network server SR, which verifies the message MD2 and encrypts the data DAT2 with the session key KC1. The network server SR then transmits a message MD3 containing the encrypted data DAT2 to the transmission device RP via the gateway equipment EP1 (step S32).

The message MD3 is transmitted by the network server SR for example following the reception, by the network server SR, of a message coming from the transmission device RP, generated by the transmission device RP or by the terminal C.

Step S32 is followed by a step S34 in which the transmission device RP receives the message MD3 via the first communication module COM1 and the transfer module TRF of the transmission device RP commands the resending of the received message MD3 by the second communication module COM2 via the communication link L2.

The message MD3 is received by the terminal C in a step E36.

In a step S50, the management server SG obtains an end of management request DG1 relating to the terminal C.

The end of management request DG1 contains an identifier of the terminal C, for example the identifier IdC, and an identifier of the transmission device RP, for example the identifier IdP.

The end of management request DG1 is for example transmitted to the management server SG by the application server SA or the network server SR after the latter has identified the reception of a high number of duplicate messages. This situation is for example due to the fact that the terminal C is now located within the coverage area of the gateway equipment EPY while at the same time remaining within the coverage area of the transmission device RP (FIG. 2).

Specifically, following the installation of the gateway equipment EPY, the messages sent by the terminal C via the link L2 are received by the transmission device RP, on the one hand, and by the gateway equipment EPY, on the other hand.

The transmission device RP transmits these messages as described above to the network server SR, via the gateway equipment EP1.

The gateway equipment EPY also relays these messages to the network server SR.

The network server SR may thus identify the dual reception of the messages and alert the management server SG or an operator.

As an alternative, the end of management request DG1 may also be entered by an operator by way of a user interface of the management server SG or of an equipment capable of communicating with the management server SG, for example following the installation of the gateway equipment EPY on the ground.

There is no limit attached to the way in which the management server SG obtains the end of management request DG1.

Step S50 is followed by a step S52 in which the management server SG sends a request DG2 to end management of the terminal C by the transmission device RP to the network server SR.

In the embodiment described, the management server SG also sends a request DRC to remove the terminal C from the list LT of connected terminals to the network server SR.

As an alternative, the request DRC is not transmitted.

The end of management request DG2 contains the identifier IdC of the terminal C. It may also contain the identifier IdP of the transmission device RP.

Step S52 is followed by a step S54 in which the network server SR receives the request DG2 and sends a request DG3 to end management of the terminal C, corresponding to the end of management request DG2, to the transmission device RP.

The end of management request DG3 is for example transmitted to the transmission device RP in response to a message transmitted thereby, for example an interrogation message.

The management request DG3 contains the identifier IdC of terminal C.

The data in the management request DG3 are encrypted by the network server SR with the session key KSP shared by the transmission device RP and the network server SR.

Following the transmission of the message DG3, the network server SR deletes the identifier IdC of the terminal C as well as the information IC1 recorded in association with this terminal identifier from the list LT of connected terminals.

As an alternative, the list LT is not updated.

Following the reception of the management request DG3 via the first communication module COM1 of the transmission device RP, the management module GST of the transmission device RP records the values contained in the management request DG3 in a memory of the transmission device RP (step S56).

Subsequently, in a step S60, the terminal C sends a message MD4 intended for the application server SA. Step S60 is for example similar to step S36 described above.

The message MD4 is for example a message containing data, for example measured data, encrypted with the session key KC1.

The message MD4 is received by the second communication module COM2 of the transmission device RP in a step S62.

According to the embodiments, the message MD4 may or may not be relayed to the network server SR by the transmission device RP.

Step S62 is followed by a step S64 in which the transmission device RP, having received the end of management request message DG3 via the first communication link L1, transmits one or more messages MFG to the terminal C via the second communication link L2. The message or messages MFG are for example transmitted in response to the message MD4. These messages MFG are encrypted with the session key KC1.

The messages MFG are generated by the management module GST and transmitted by the second communication module COM2 of the transmission device RP.

These messages contain parameters PAR for configuring the terminal and a request DC for the terminal C to send a new connection request.

The request DC is for example formulated using the "ForceRejoinReq" option defined in version 1.1 of the LoRaWAN™ standard.

As an alternative, these messages do not comprise terminal configuration parameters.

The configuration parameters PAR contained in the message or messages MFG comprise for example a list of channels supported by the gateway equipment EPY and/or a list of frequency channels to be invalidated as they are specific to the transmission device RP and not used by the gateway equipment EPY.

Updating of the channel list is for example requested in the form of a "New Channel" request defined in the LoRaWAN™ standard.

The configuration parameters PAR contained in the message or messages MFG may also comprise one or more response timeout values. Such a response timeout is for example a time interval between the end of sending of a message by the terminal C and the start of a reception window during which the terminal C listens for a response.

Updating of this timeout is for example requested using a "MAC RXTimingSetupReq" option defined in the LoRaWAN™ standard.

Following the reception of the message or messages MFG, the terminal C sends an acknowledgement of receipt ACK of the messages MFG (step S66).

The message ACK is received by the second module COM2 of the transmission device RP and, following the reception of the message ACK, the management module GST of the transmission device RP commands the removal of the terminal C from the list TG of terminals for which it has management rights (step S68). More precisely, the transmission device RP deletes the identifier IdC of the terminal C and the information recorded in association with this identifier from the list TG.

Following the reception of the request DC contained in the messages MFG, the terminal C resends a new connection request DA3 (step S70).

The connection request DA3 contains the identifier IdC of the terminal C, the identifier IdS of the application server SA to which the terminal C requests to be connected and a random value AL5 generated by the terminal C.

The connection request DA3 is for example a "JoinRequest" message defined in the LoRaWAN™ standard.

The request DA3 is received by the second module COM2 of the transmission device RP but, since the terminal C is no longer contained in the list TG of terminals managed by the transmission device RP, the connection request DA3 is not taken up by the transmission device RP.

The request DA3 is also received by the gateway EPY, which relays it to the network server SR (step S72).

Step S72 is followed by a step S74 in which a communication session SC3 is established between the terminal C and the network server SR, via the gateway equipment EPY.

More precisely, following the reception of the connection request DA3, the network server SR generates a random value AL6, a session key KC2 and an address AD2 for the terminal C. The session key KC2 is generated conventionally using the primary key KPC associated with the terminal C, the received random value AL5 and the random value AL6.

The network server SR then generates and transmits a connection acceptance message MA3. The message MA3 contains in particular the random value AL6 and the generated address AD2. It may also contain configuration parameters of the terminal.

The message MA3 is for example a JoinAccept message defined in the LoRaWAN™ standard.

Information relating to the connection, that is to say to the established session SC3, is recorded in the list LT of connected terminals by the network server SR. This information is for example the identifier IdC of the terminal C, the identifier IdS of the application server SA and the generated session key KC2.

Following the reception of the message MA3, the terminal C in turn generates the session key KC2.

As is known, establishing the session SC3 allows the terminal C to transmit data messages to the application server SA. The data messages contain an identifier IdC of the terminal C and data encrypted with the session key KC2. The data messages are received by the network server SR, which decrypts the data with its session key KC2 recorded in the list LT in association with the identifier IdC of the terminal C The network server SR then transmits the decrypted data to the application server SA associated with the terminal C via the link LS.

In turn, the application server SA may transmit a message in response to a message received from the terminal C. This message is transmitted by the application server SA to the network server SR, which encrypts its content with the session key KC2 before transmitting it to the terminal C.

Steps S0, S2, S6, S10, S12, S14, S22, S34, S56, S62, S64 and S68 implemented by the transmission device RP represent steps of the management method according to one embodiment of the invention.

In the embodiment described, the transmission device RP, following the reception of the request DG3 to end management of the terminal C, transmits messages MFG via the communication link L2.

As an alternative, the transmission device RP does not transmit messages MFG.

Upon receiving messages transmitted by the terminal C, the transmission device RP does not process these messages. It then acts as though it did not receive them.

The terminal C continues to send messages encrypted with the session key KC1. These messages are relayed by the gateway equipment EPY to the network server SR, which decrypts these messages. Similarly, the network server SR transmits messages, containing data generated by the application server SA and encrypted by the network server SR with the key KC1, to the terminal C via the gateway equipment EPY.

This communication continues until the terminal C sends a new connection request. Sending this new connection request leads to a new communication session being established between the terminal C and the network server SR, and consequently the generation of a new session key.

In the embodiment described, when a session is established between the terminal C or the transmission device RP and an application server, for example the management server SG or the application server SA, the authentication of the terminal or of the transmission device is performed by the network server SR.

As a variant, such authentication may be performed by the management server, the application server SA or another equipment of the network, for example an authentication server of the network. In this variant, the data associated with an application server and required to implement the authentication are made available to this server.

A secondary key generated from a primary key may be made available to the network server, which authenticates and/or decrypts the messages coming from a terminal or from a transmission device before transmitting them, preferably via a secure link, to the application server in question.

Conversely, the messages generated by an application server are signed and/or encrypted with the secondary key by the network server before transmission to a terminal or to a transmission device.

A secondary key generated from a primary key may also be made available to the application server, which may then take responsibility for encrypting the messages before transmission and decrypt the received messages.

In the described embodiment, a session key is generated during each mutual authentication. A session key KSP is generated during mutual authentication of the transmission device RP and of the management server SG, a session key KC1 is generated during mutual authentication of the terminal C and of the transmission device RP and a session key KC2 is generated during mutual authentication of the terminal C and of the application server SA.

These session keys are application session keys within the meaning of the LoRaWAN™ standard.

In LoRaWAN™ architectures, the security of the exchanges between the terminals and the application servers is ensured on two separate levels, i.e. at the network level via various integrity checks performed by the network server acting as intermediary between the terminals and the application servers and by the terminals themselves, and at the application level, through the encryption/decryption of the application data exchanged between the terminals and the application servers. Each of these mechanisms relies, during each session established by a terminal with an application server via the server of the network, on the known AES encryption algorithm used in the LoRaWAN™ protocol, parameterized either by way of cryptographic network session keys or by way of cryptographic application session keys. These cryptographic keys in this case have a size of 128 bits. It should be noted, however, that the invention easily makes it possible to contemplate symmetric encryption algorithms other than the AES encryption algorithm, as well as other key sizes.

The invention also applies to this architecture.

Thus, in one variant embodiment, during the mutual authentication required by the transmission device RP, the authentication request DA1 sent by the transmission device RP is intercepted by a network server SR of the LoRa™ network.

Following the reception of the authentication request DA1, the network server SR generates a network key KRP, on the one hand, and the session key KSP, on the other hand.

Similarly, the transmission device RP also generates the network key KRP in addition to the session key KSP.

The messages transmitted by the transmission device RP to the management server SG contain data encrypted by the session key KSP and then signed by the network key KRP. Each message is received by the network server SR, which checks the integrity and authenticity thereof by virtue of its network key KRP, and transmits them to the management server SG, which decrypts it with the session key KSP. As an alternative, if it has been mandated to do so, the network server SR may decrypt the message with the session key KSP and transmit the decrypted message to the management server SG via the preferably secure link LS.

Similarly, in the step of mutual authentication between the terminal C and the transmission device DP, a network key KRC1 may be generated from the primary key KPC by the terminal C, on the one hand, and by the transmission device RP, on the other hand.

Similarly, in the step of mutual authentication between the terminal C and the network server SR, a network key KRC2 may be generated from the primary key KPC by the terminal C, on the one hand, and by the network server SR of the LoRa™ network, on the other hand.

The messages then transmitted by the terminal C are then also signed by the network key KRC2 or KRC1.

As a variant of this embodiment, upon receiving a data message encrypted with the session key KC2 and signed with the network key KRC2, from the terminal C, the transmission device RP obtains the data DATA encrypted with the session key KC2, that is to say KC2(DATA), using the network key KRC2. It then encrypts these encrypted data (KC2(DATA)) with the session key KSP, and then signs them with the network key KRP before transmitting the message thus obtained.

The message is obtained by the network server SR, which obtains and transmits the data encrypted with the session key KSP to the management server SG. This message is received by the management server SG, which obtains the data encrypted with the key KC2 using its key KSP and transmits the obtained message. This message is finally received by the application server SA, which obtains the data DATA using the key KC2.

The invention claimed is:

1. A management method, performed by a transmission device configured to communicate via a first radio link using Long Range radio (LoRa) technology with a gateway equipment forming a node of a telecommunications network and configured to communicate with at least one server of the network via the gateway equipment, the method comprising:
following the reception of a first connection request sent via a second radio link using LoRa technology, by a terminal contained in a list of terminals for which the transmission device has obtained management data, establishing a secure communication session between the transmission device and the terminal,
upon reception of a data message sent by the terminal via the secure session and upon a determination that the terminal is contained in the list of terminals, transmitting the message via the first radio link;
upon reception, via the first radio link, of a data message intended for the terminal and upon a determination that the terminal is contained in the list of terminals, transmitting message to the terminal via the secure session;
receiving, via the first communication link, a request to end management of the terminal; and
following the reception of the request, removing the terminal from the list of terminals.

2. The method of claim 1, wherein, following the reception of the request, the transmission device sends, to the terminal, a request for the terminal to send a second connection request.

3. The method of claim 1, wherein establishing the secure session comprises generating a session key shared between the transmission device and the terminal, the session key generated from at least some of the management data.

4. The method of claim 1, wherein the request to end management of the terminal is received via the gateway equipment and via the network server.

5. The method of claim 1, wherein the request to end management of the terminal is transmitted to the transmission device via a secure communication session established between the transmission device and a server of the network.

6. The method of claim 1, wherein the send request is sent in response to a message sent by the terminal via the communication session established between the terminal and the transmission device.

7. The method of claim 1, wherein the terminal is removed from the list after reception of an acknowledgement of receipt sent by the terminal in response to the send request.

8. The method of claim 2, wherein the reception of the request to end management of the terminal is followed by sending of a New Channel request defined in the LoRaWAN™ standard.

9. The method of claim 3, wherein the data messages sent by the terminal comprise data encrypted or signed with the session key shared by the terminal and the transmission device.

10. The method of claim 3, wherein the method further comprises transmitting data relating to the generated management key to a server of the network.

11. A transmission device comprising a processor and a memory, wherein the transmission device is configured to:

communicate with a gateway equipment forming a node of a telecommunications network via a first radio link using Long Range radio (LoRa) technology and to communicate with at least one server of the network via the gateway equipment;

communicate with at least one terminal via a second radio link using LoRa technology, the device configured to receive, via the second radio link, a first connection request sent by a terminal contained in a list of terminals for which the transmission device has obtained management data;

establish, following the reception of the first connection request, a secure communication session between the transmission device and the terminal, upon confirmation that the terminal is contained in the list of terminals, transfer, via the first communication link, at least one data message sent via the secure session by the terminal;

upon reception of a data message intended for the terminal via the first communication link and upon confirmation that the terminal is contained in the list of terminals, transfer the message to the terminal via the secure session;

receive, via the first communication link, a request to end management of the terminal; and remove the terminal from the list of terminals following the reception of the request.

* * * * *